United States Patent
Zhong et al.

(10) Patent No.: US 9,519,601 B2
(45) Date of Patent: Dec. 13, 2016

(54) DATA STORAGE SYSTEM AND MANAGEMENT METHOD THEREOF

(71) Applicant: VIA Alliance Semiconductor Co., Ltd., Shanghai (CN)

(72) Inventors: Ling-Yan Zhong, Beijing (CN); Zhi-Qiang Hui, Beijing (CN); Jiin Lai, New Taipei (TW)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 102 days.

(21) Appl. No.: 14/271,867

(22) Filed: May 7, 2014

(65) Prior Publication Data

US 2015/0134889 A1    May 14, 2015

(30) Foreign Application Priority Data

Nov. 12, 2013  (CN) .......................... 2013 1 0560162

(51) Int. Cl.
*G06F 3/06*   (2006.01)
*G06F 13/28*  (2006.01)

(52) U.S. Cl.
CPC ....... *G06F 13/28* (2013.01); *G06F 2206/1014* (2013.01)

(58) Field of Classification Search
CPC  G06F 13/28; G06F 2206/1014; G06F 3/0619; G06F 3/06; G06F 3/0601; G06F 3/0602; G06F 12/0246; G06F 3/0679; G06F 2212/2022; G06F 2212/7211; G11C 16/102
See application file for complete search history.

(56) References Cited

U.S. PATENT DOCUMENTS

| | | | | |
|---|---|---|---|---|
| 4,835,678 A | * | 5/1989 | Kofuji | G06F 12/0859 711/118 |
| 5,442,785 A | * | 8/1995 | Roffe | G06F 9/546 |
| 5,673,413 A | * | 9/1997 | Deshpande | G06F 12/0817 710/107 |
| 5,701,516 A | * | 12/1997 | Cheng | G06F 12/0804 710/22 |

(Continued)

FOREIGN PATENT DOCUMENTS

| | | |
|---|---|---|
| CN | 102460405 | 5/2012 |
| TW | 201237635 | 9/2012 |
| TW | 201314450 | 4/2013 |

*Primary Examiner* — Jared Rutz
*Assistant Examiner* — Jean Edouard
(74) *Attorney, Agent, or Firm* — McClure, Qualey & Rodack, LLP

(57) ABSTRACT

Data storage system and management method thereof are provided. The method, adopted by a data storage device coupled to a host device via a bus, includes: determining the data storage device requires to use a first temporary memory of the host device to access data in a second temporary memory of the data storage device; based on the determination, issuing a Device Bus Master (DBM) request message via the bus to the host to request for a right to control data transfer on the bus; in response to the DBM request message, detecting the bus to determine whether to receive a first DBM acknowledgement message from the host device; and if the first DBM acknowledgement message is received, then accessing the first temporary memory of the host device.

23 Claims, 13 Drawing Sheets

(56) References Cited

U.S. PATENT DOCUMENTS

| | | | | |
|---|---|---|---|---|
| 6,052,772 A * | 4/2000 | Kark | G06F 13/1605 | 711/151 |
| 6,256,718 B1 * | 7/2001 | Uchida | G06F 12/0661 | 711/171 |
| 6,609,145 B1 * | 8/2003 | Thompson | G06F 9/4843 | 714/E11.034 |
| 8,458,435 B1 * | 6/2013 | Rainey, III | G06F 12/0246 | 711/103 |
| 8,583,835 B1 * | 11/2013 | Kan | G06F 3/00 | 341/106 |
| 8,935,465 B1 * | 1/2015 | Shaharabany | G06F 12/0246 | 711/103 |
| 2002/0161956 A1 * | 10/2002 | Kanzaki | G06F 13/161 | 710/240 |
| 2003/0126347 A1 * | 7/2003 | Tan | G06F 3/0607 | 710/313 |
| 2003/0135699 A1 * | 7/2003 | Matsuzaki | G06F 13/1605 | 711/149 |
| 2005/0188058 A1 * | 8/2005 | Inoue | G11B 19/02 | 709/219 |
| 2006/0026198 A1 * | 2/2006 | Emery | G06F 17/30578 | |
| 2006/0161733 A1 * | 7/2006 | Beckett | G06F 13/4059 | 711/118 |
| 2007/0067534 A1 * | 3/2007 | Butler | G06F 13/24 | 710/260 |
| 2007/0204055 A1 * | 8/2007 | Oishi | G06F 13/385 | 709/230 |
| 2009/0125592 A1 * | 5/2009 | Hartwich | H04L 49/90 | 709/206 |
| 2009/0132736 A1 * | 5/2009 | Hasan | G06F 13/1605 | 710/56 |
| 2009/0161511 A1 * | 6/2009 | Yoshimoto | G11B 19/12 | 369/53.2 |
| 2010/0057948 A1 * | 3/2010 | Hemmi | G06F 3/0625 | 710/20 |
| 2010/0306441 A1 * | 12/2010 | Kawaguchi | G06F 13/362 | 710/310 |
| 2011/0296088 A1 * | 12/2011 | Duzly | G06F 12/0246 | 711/103 |
| 2012/0005404 A1 * | 1/2012 | Raz | G06F 3/0617 | 711/103 |
| 2012/0212325 A1 * | 8/2012 | Kanemoto | G08C 17/02 | 340/10.1 |
| 2012/0233401 A1 * | 9/2012 | Liu | G06F 13/1605 | 711/115 |
| 2012/0284466 A1 | 11/2012 | Galbo et al. | | |
| 2013/0179503 A1 * | 7/2013 | Wilson | H04L 51/16 | 709/204 |
| 2013/0191609 A1 * | 7/2013 | Kunimatsu | G06F 12/10 | 711/203 |
| 2013/0290647 A1 * | 10/2013 | Maeda | G06F 3/0646 | 711/149 |
| 2014/0244904 A1 * | 8/2014 | Kondo | G06F 13/1684 | 711/103 |
| 2014/0325168 A1 * | 10/2014 | Yun | G06F 3/06 | 711/159 |
| 2015/0012671 A1 * | 1/2015 | Park | G06F 1/3268 | 710/5 |

* cited by examiner

DATA STORAGE SYSTEM AND MANAGEMENT METHOD THEREOF

CROSS REFERENCE TO RELATED APPLICATIONS

This application claims priority of Chinese Patent Application No. 201310560162.6 filed on Nov. 12, 2013, and the entirety of which is incorporated by reference herein.

BACKGROUND OF THE INVENTION

Field of the Invention

The present invention relates to flash memory, and in particular to a method for managing a flash memory and a system thereof.

Description of the Related Art

Flash memory is an electronically erasable and programmable read only memory, allowing data to be erased or written repeatedly in operation, applicable to devices such as memory cards or removable disk drives. The flash memory usually includes various management tables, buffered in a Random Access Memory (RAM) of the flash memory. During access operations to the flash memory, the management tables are utilized and updated in the RAM. The management tables include a logical-to-physical address mapping table which records and manages a corresponding relationship of logical addresses and physical addresses, a bad block table which records bad memory blocks in the flash memory, and the like. Other than the various management tables, the RAM in the flash memory also buffers data used while it is being accessed.

Since the memory space of the RAM in the flash memory is limited, consequently the data size of the buffered management tables and buffered data are also limited. As sizes of flash memories grow, the sizes of the buffered management tables and data also increase accordingly. Simply adopting a larger RAM to resolve the issue will lead to an increase in the manufacturing cost and product dimensions. As a result, a memory management method is needed to increase the memory space for buffering the management tables and data without increasing the manufacturing cost and the product dimensions, controlling and managing the buffered management tables and data under all transfer conditions.

BRIEF SUMMARY OF THE INVENTION

A detailed description is given in the following embodiments with reference to the accompanying drawings.

An embodiment of a method is provided, adopted by a data storage device coupled to a host device via a bus, comprising: determining that the data storage device requires to use a first temporary memory of the host device to store data in a second temporary memory of the data storage device; based on the determination, issuing a Device Bus Master (DBM) request message via the bus to the host device to request for a right to control data transfer on the bus; in response to the DBM request message, detecting the bus to determine whether to receive a first DBM acknowledgement message from the host device; and if the first DBM acknowledgement message is received, then accessing the first temporary memory of the host device.

Another embodiment of a data storage system is disclosed, comprising a data storage device and a host device. The host device is coupled to the data storage device through a bus. The data storage device comprises a data storage controller and a data storage transceiver. The data storage controller is configured to determine the data storage device requires to use a first temporary memory of the host device to sore data in a second temporary memory of the data storage device. The data storage transceiver, coupled to the data storage controller, based on the determination, is configured to issue a Device Bus Master (DBM) request message via the bus to the host device to request for a right to control data transfer on the bus. The host device comprises a host device controller, after detecting the DBM request message, configured to issue a first DBM acknowledgement message via the bus. The data storage controller is configured to detect the bus to determine whether to receive the first DBM acknowledgement message from the host device, and if the first DBM acknowledgement message is received, then access the first temporary memory of the host device.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The data storage device mentioned below includes a controller, a temporary memory and a flash memory. Said data storage device is a removable flash storage device or embedded flash storage device, like a USB (Universal Serial Bus) flash removable disk drive or memory card, a Secure Digital SD card, a micro SD card, a mini SD card, a MMC (MultiMediaCard) or CF (Compact Flash) card.

Figure 1:
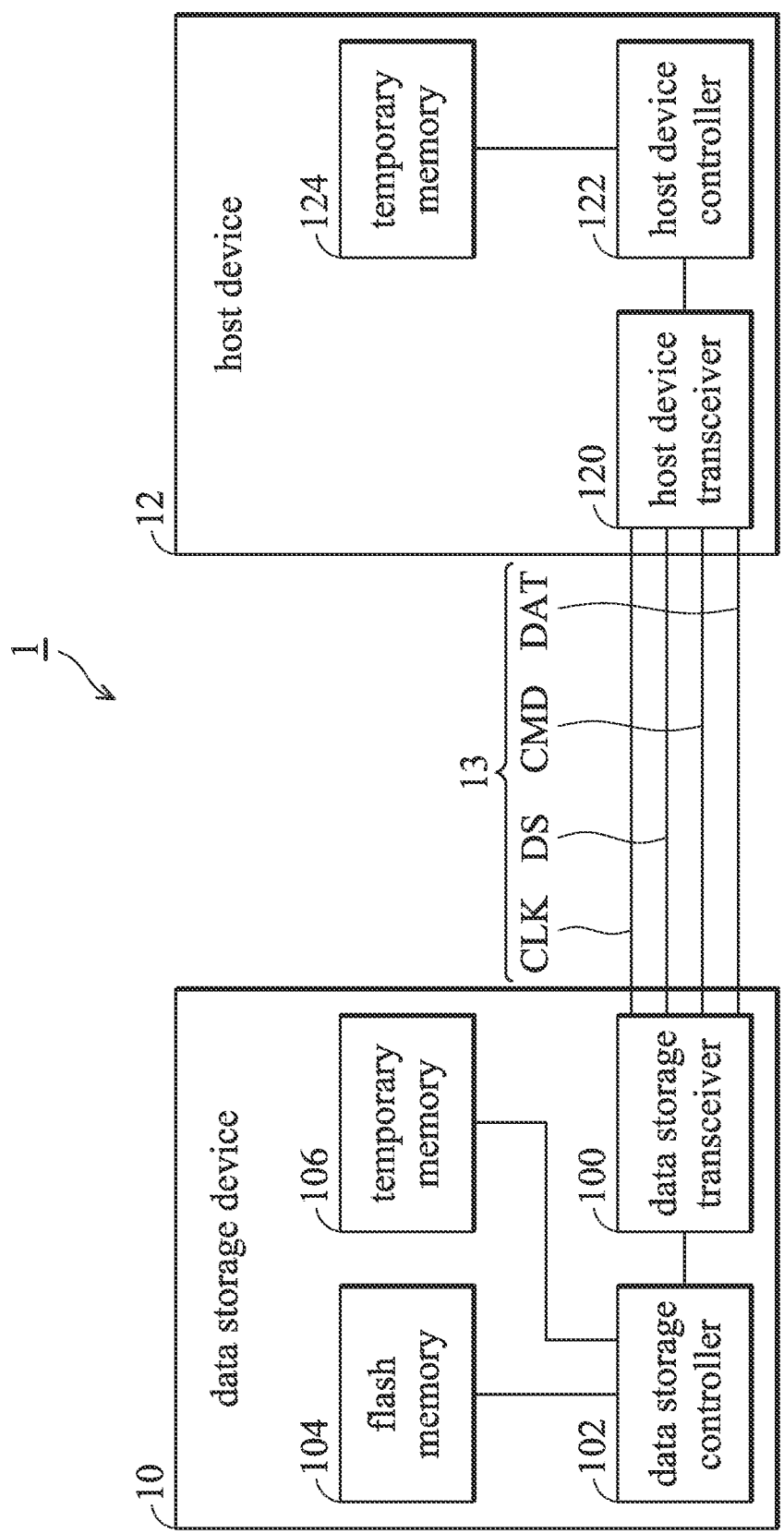
FIG. 1 is a block diagram of a data storage system 1 according to an embodiment of the invention.

FIG. 1 is a block diagram of a data storage system 1 according to an embodiment of the invention, including a data storage device 10 and a host device 12 coupled thereto by a bus 13. The data storage system 1 may be a mobile phone, a personal digital assistant (PDA), a tablet, a laptop, a personal computer, a palm game console, a digital camera, a consumer electronic device or another computing device. In one embodiment, the data storage device 10 is an eMMC card, and the host device 12 is a processor chip. The communication signals between the eMMC card and the host device 12 comply with JEDEC eMMC or later specifications. The bus 13 coupling the data storage device 10 and the host device 12 includes a clock line CLK, a data strobe signal line DS, a command signal line CMD, a data signal line DAT, a power signal line (not shown), and a reset signal line (not shown), wherein the clock line CLK includes one signal line, the data strobe signal line DS includes 1 signal line, the command signal line CMD includes 1 signal line, the data signal line DAT includes 8 signal lines, the power signal line includes 2 signal lines, and the reset signal line includes 1 signal line.

The data storage device 10 and the host device 12 contain internal temporary memories 106 and 124, respectively. When the data storage device 10 and the host device 12 are in connection with each other, the data storage device 10 not only may use the local internal temporary memory 106, but also may use the internal temporary memory 124 of the host device 12 for data-buffering operations. The buffered data includes, for example, data and management tables, like a logical-to-physical address mapping table, that is, the temporary memory space of the data storage device 10 may be extended to the internal memory of the host device 12, buffering the management tables and data to the temporary memory 124 of the host device 12. The data storage device 10 may dynamically utilize the internal temporary memory 124 of the host device 12 to buffer the data and management tables which were originally to be buffered in the local temporary memory 106.

On determining that the data or management tables are required to be buffered in the temporary memory 124 of the host device 12, the data storage device 10 can issue a device bus master (DBM) request message to the host device 12 at any stage during the connection of the data storage device 10 and the host device 12, which includes a read stage, a write stage and an idle stage, thereby requesting to the host device 12 for a right to control data transfer on the bus 13. Upon the host device 12 granting the right to control data transfer, the data storage device 10 can access the temporary memory 124 of the host device. The DBM request message has the highest processing priority over the read procedure, the write procedure or the idle procedure. During an ongoing normal read or write procedure, the host device 12 can suspend the ongoing read or write procedure upon receiving the DBM request message and respond the DBM request. After the data service requested by the DBM request is completed, the host device 12 can then resume the suspended read or write procedure. The host device 12 is fully aware of all ongoing operations throughout the entire DBM service procedure, and no other procedure is permitted to interrupt the DBM service procedure. The bus 13 is not limited to any particular type of bus specification, so long as the bus 13 contains a signal line which can be used to issue the DMB request from the data storage device 10 to the host device 12 during a normal data transfer procedure.

The data storage device 10 includes a data storage transceiver 100, a data storage controller 102, a flash memory 104 and a temporary memory 106. The data storage transceiver 100 is coupled to the data storage controller 102 the flash memory 104 and the temporary memory 106. The flash memory 104 may include one or more flash memories. The data storage controller 102 may store the management information of the accessed data into the temporary memory 106 in a form of the management table, and access the correct physical address according to the management table when later accessing the data in the flash memory 104. The temporary memory 106 may be a RAM, which stores the management tables of the data storage device 10 or the buffered data generated during the data access processing. The data storage controller 102 may adopt the DBM service procedure to access the internal temporary memory (storage space) 124 of the host device 12. The data storage transceiver 100 is configured to perform data transfer with the host device 12.

The host device 12 includes a host device transceiver 120, a host device controller 122 and a temporary memory 124. The host device controller 122 can access the program codes and data stored in the temporary memory 124. The temporary memory 124 may be a RAM, which stores the program codes to be executed by the host device controller 122, the buffered data, and the management tables and buffered data of the data storage device 10. In one embodiment, the temporary memory 124 is the host memory of the host device 12. The host device controller 122 is coupled to the host device transceiver 120 and the temporary memory 124. The host device transceiver 120 is configured to perform data transfer with the data storage device 10.

Figure 2:
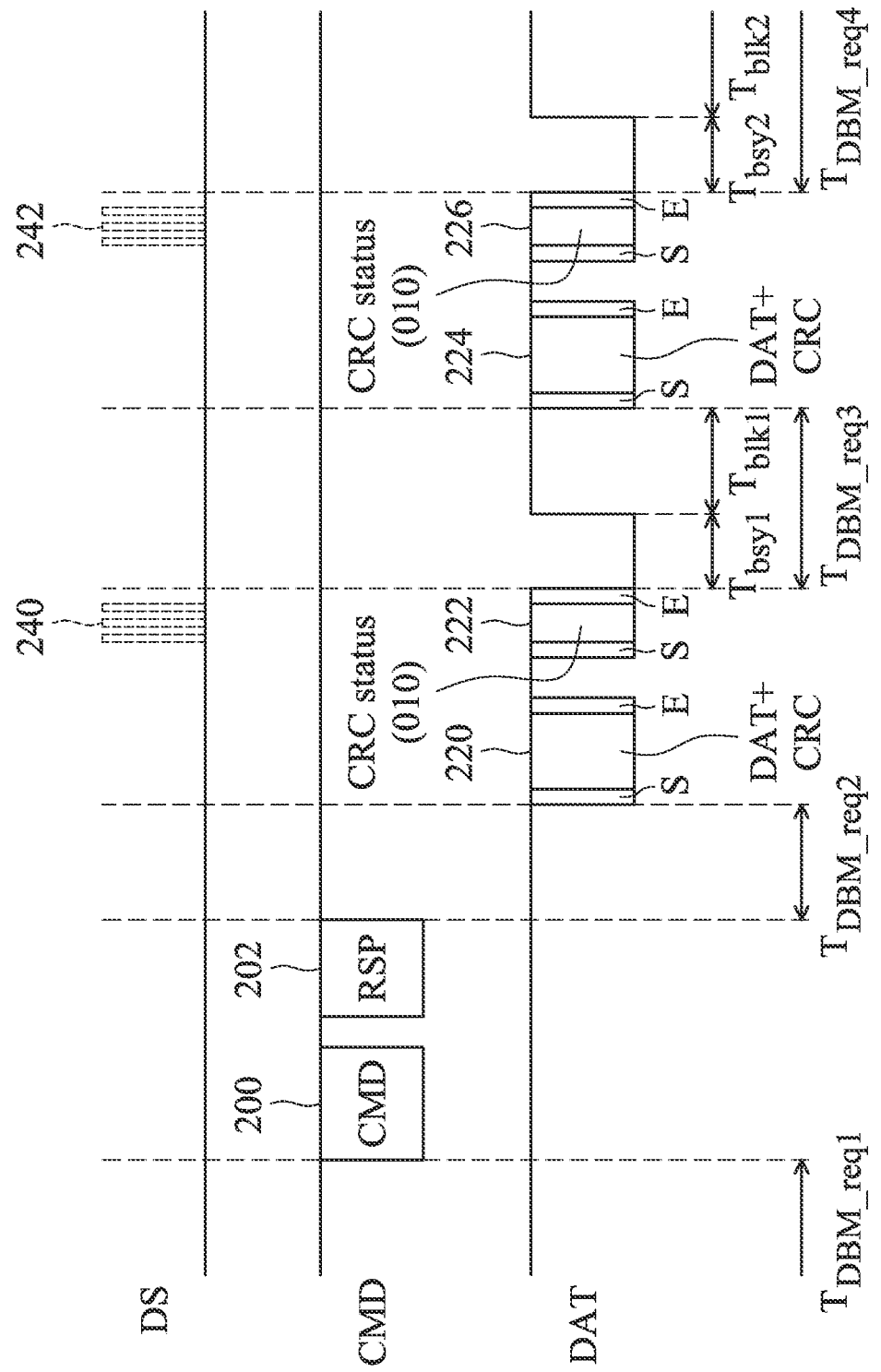
FIG. 2 is a timing diagram of a normal write procedure according to an embodiment of the invention.
Figure 3:
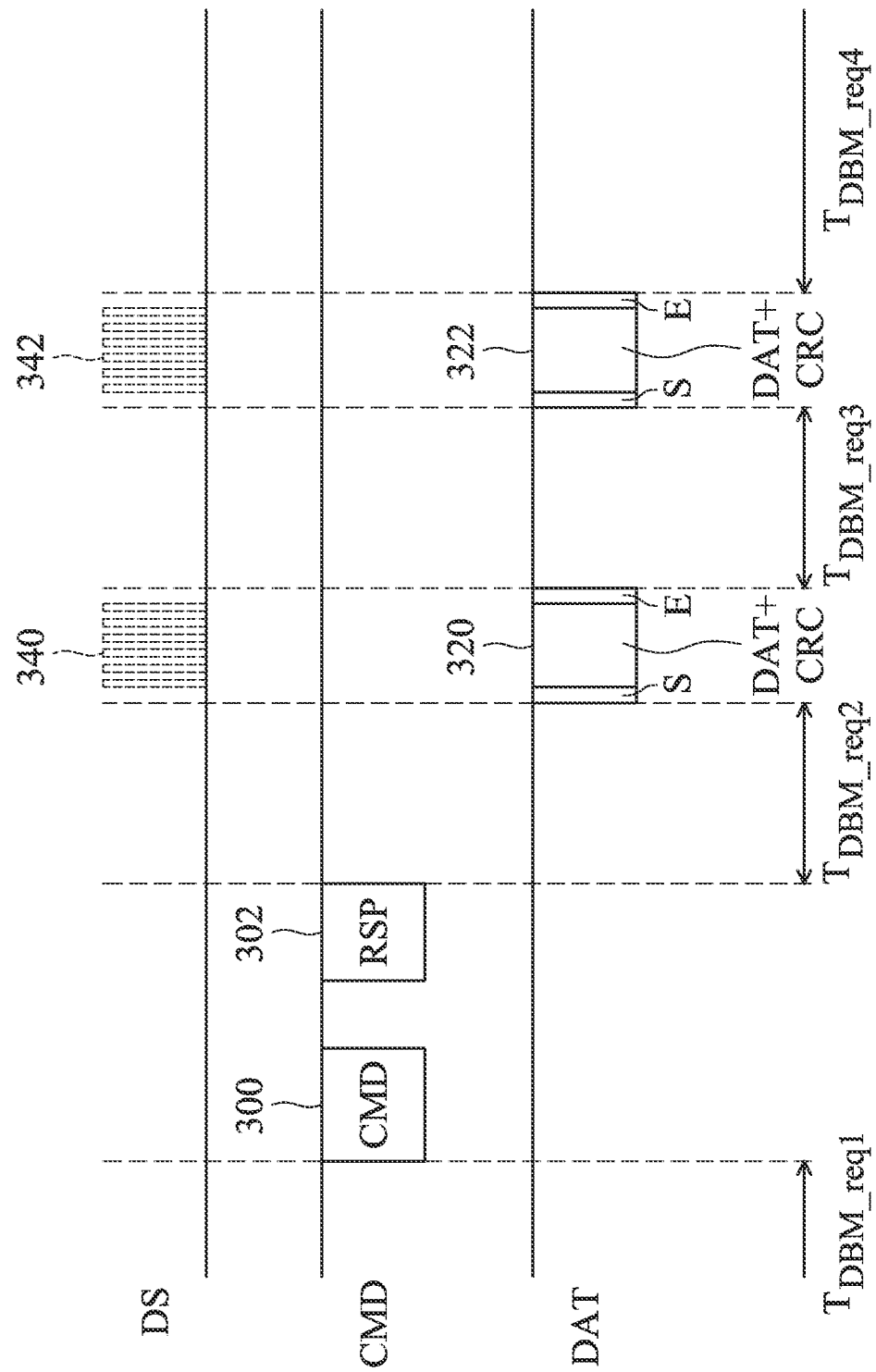
FIG. 3 shows a timing diagram of a normal read procedure according to an embodiment of the invention.

During a normal read or write procedure, the host device 12 is configured to write normal data into the data storage device 10 and read the normal data from the data storage device 10, detailed by FIGS. 2 and 3. FIG. 2 is a timing diagram of a normal write procedure according to an embodiment of the invention, wherein only the signals on the data strobe signal line DS, the command signal line CMD and the data signal line DAT are shown. Specifically, hereinafter the data signal line DAT in the diagram illustrates only DAT[0] of the data signal line DAT. Other undrawn signals includes the clock line CLK which toggles in a fixed period, the power signal line which continuously supplies power to the data storage device 10, and the reset signal line which only operates when the data storage device 10 requires a reset.

In the normal write procedure, the host device 12 is configured to initiate a write command 200, and in response to the received write command 200, the data storage device 10 is configured to respond with a response command 202 to the host device 12. The response command 202 indicates the write command 200 has been received and the data storage device 10 is ready to receive the write data. Upon receiving the response command 202 the host device 12 is configured to transmit the normal write data to the data storage device 10 by the data message 220. The data message 220 may be configured to package the write data in a data packet which includes a start bit S, the write data DAT, a data verification code, like a Cyclic Redundancy Check (CRC) code, and an end bit E. Upon receiving the data message 220, the data storage device 10 is configured to perform a CRC check, return the CRC check result to the host device 12 by a verification status message 222, and concurrently transmit a toggling data strobe signal 240 to prompt the host device to begin receiving the verification status message 222, wherein the verification status message 222 includes a start bit S, a verification result of CRC status, and an end bit E. For example, the verification result of the CRC status 010 indicates the write data DAT is correct, and the verification result of the CRC status 101 indicates the write data DAT is incorrect. The verification result of the CRC status may be, but is not limited to being, serially transmitted on the data signal line DAT[0]. In the case of more than one write data, the host device 12 can deliver the next data message 224 to the data storage device 10 and receive the corresponding verification status message 226 from the data storage device 10.

As illustrated in FIG. 2, there is an idle interval $T_{DBM\_req1}$ present prior to the host device 12 sending the write command 200; during the normal write procedure, the host device 12 is not always occupied, after the host device 12 has received the response command 202 and before transmitting the first data message 220, there is also present an idle interval $T_{DBM\_req2}$; after the host device 12 has received the verification status message (e.g., 222) and before transmitting the next data message (e.g., 224), there is another idle interval (e.g., $T_{DBM\_req3}$ and $T_{DBM\_req4}$ in FIG. 2). Within the idle intervals $T_{DBM\_req1}$ through $T_{DBM\_req4}$, the host device 12 will remain idle and not receive or transmit any data, and it can detect the DBM request sent by the data storage device 10, and subsequently provide the DBM service procedure.

Take the idle interval $T_{DBM\_req3}$ as an example, the idle interval $T_{DBM\_req3}$ includes a busy period $T_{bsy1}$ and a block gap $T_{blk1}$. After receiving the data message 220 and responding with the verification status message 222, the data storage device 10 needs a certain period of time to process the write data DAT, and consequently any other command or data arriving in the period will be ignored. This is referred to as the busy period $T_{bsy1}$. During the busy period $T_{bsy1}$, the data storage device 10 is configured to pull down the data signal line DAT, signifying the busy period $T_{bsy1}$, and pull up the data signal line DAT again indicating the busy period $T_{bsy1}$ is over. The idle interval after the busy period is over and before the next write data arrives is referred to as the block gap $T_{blk1}$. The host device 12 can detect the DBM request message sent by the data storage device 10 in the idle interval $T_{DBM\_req3}$, which includes the busy period $T_{bsy1}$ and the block gap $T_{blk1}$, and perform the DBM service procedure accordingly.

Refer to FIG. 3, showing a timing diagram of a normal read procedure according to an embodiment of the invention. In the normal read procedure, the host device 12 first transmits a read command 300 which includes information such as an address and a length of the data to be read. In response to the read command 300, the data storage device 10 can respond with a response command 302 to the host device 12, indicating the read command 300 has been received and the data storage device 10 is ready to transmit the read data to the host device 12. Next, the data storage device 10 is configured to start sending the normal read data to the host device 12 by the data message 320, and toggle the data strobe signal 340 on the data strobe signal line DS to prompt the host device 12 to start receiving the read message 320. The data message 320 may be configured to package the read data in a data packet which includes a start bit S, the read data DAT, a data verification code, like a Cyclic Redundancy Check (CRC) code, and an end bit E. Upon receiving the data message 320, the host device 12 is configured to perform a CRC check. In the case where there are more than one read data, the data storage device 10 is configured to send the next data message 322 and the corresponding data strobe signal 342 to the host device 12.

As illustrated in FIG. 3, there is an idle interval $T_{DBM\_req1}$ present before the host device 12 sends the read command 300; during the normal read procedure, the host device 12 is not always occupied, after the host device 12 has received the response command 302 and before receiving the first data message 320, there is also present an idle interval $T_{DBM\_req2}$; after the host device 12 has received the data message (e.g., 320) and before receiving the next data message (e.g., 322), there is another idle interval (e.g., $T_{DBM\_req3}$ and $T_{DBM\_req4}$ in FIG. 3). In the idle intervals $T_{DBM\_req1}$ through $T_{DBM\_req4}$, the host device 12 will remain idle and not receive or transmit any data, and it can detect the DBM request sent by the data storage device 10 to request for a control of data transfer, and subsequently provide the DBM service procedure. For example, in FIG. 3, taking the idle interval $T_{DBM\_req3}$ as an example, this kind of idle interval is referred to as a block gap.

Return to the embodiment in FIG. 1, the data storage system 1 is configured to initiate the internal circuit components upon startup, the host device 12 is configured to start a boot loader to configure a memory range in the temporary memory 124, which the data storage device 10 can access. The accessible memory range may be a part of memory in the temporary memory 124, and is defined by the eMMC device memory base address [63:0]. The following Table 1 lists the register parameters of the host device 12, which is relevant to the eMMC device memory base address.

TABLE 1

| Bit | Attribute | Default | Description | Mnemonic |
| --- | --- | --- | --- | --- |
| 64:0 | RW | 0 | eMMC Device Memory Base Address ((Random)) This register is programmed by boot loader. It indicates the base address of the system memory which is reserved for eMMC Device Bus Master feature. In 32-bit addressing mode, bit[63:32] should set to 0. | DEVMEM_BA |

Then, the host device 12 is configured to execute the driver of the data storage device 10, such as eMMC driver. The driver may be configured to read a DBM capability parameter from an internal register in the host device controller 122 of the host device 12. If the DBM capability parameter is read as 1, this indicates the host device 12 supports the DBM service, if the DBM capability parameter is read 0 then the host device does not support the DBM service. Next, the driver read the DBM capability parameter from an internal register in the data storage device 10. If the DBM capability parameter is read as 1, this indicates the data storage device 10 supports the DBM service, if the DBM capability parameter is read 0 then the data storage device 10 does not support the DBM service. When the host device 12 and the data storage device 10 are both confirmed supporting the DBM service, the driver can configure a DBM-enable parameter. If the DBM-enable parameter is 1, then the host device 12 is configured to respond the eMMC DBM request. If the DBM-enable parameter is 0, then the host device 12 is configured to ignore the eMMC DBM request. When the DBM-enable parameter is 0, the driver is configured to switch off the functionality of the eMMC DBM service in the data storage device 10, to prevent from a bus collision. When the DBM-enable parameter is 1, the driver is configured to enable a DBM fatal error interrupt signal enable parameter and a DBM fatal error interrupt status enable parameter. Table 2 lists all register parameters of the host device 12, which is relevant to the DBM control.

TABLE 2

| Bit | Attribute | Default | Description | Mnemonic |
|---|---|---|---|---|
| 15:5 | RO | 0 | Reserved | DEVMST_CTL[15:5] |
| 4 | RW | 0 | eMMC Device Bus Master Fatal Error Interrupt Signal Enable<br>0: disable<br>1: enable | DEVMST_CTL4] |
| 3 | RW | 0 | eMMC Device Bus Master Fatal Error Interrupt Status Enable<br>0: disable<br>1: enable | DEVMST_CTL3] |
| 2 | RW1C | 0 | eMMC Device Bus Master Fatal Error Interrupt<br>0: no interrupt<br>1: interrupt | DEVMST_CTL2] |
| 1 | RW | 0 | eMMC Device Bus Master Enable<br>0: disable Device Bus Master mode for host controller<br>1: enable Device Bus Master mode for host controller | DEVMST_CTL1] |
| 0 | RO | 1 | eMMC Device Bus Master Capability<br>0: host do not support eMMC Device Bus Master feature.<br>1: host support eMMC Device Bus Master feature. | DEVMST_CTL0] |

Figure 4:
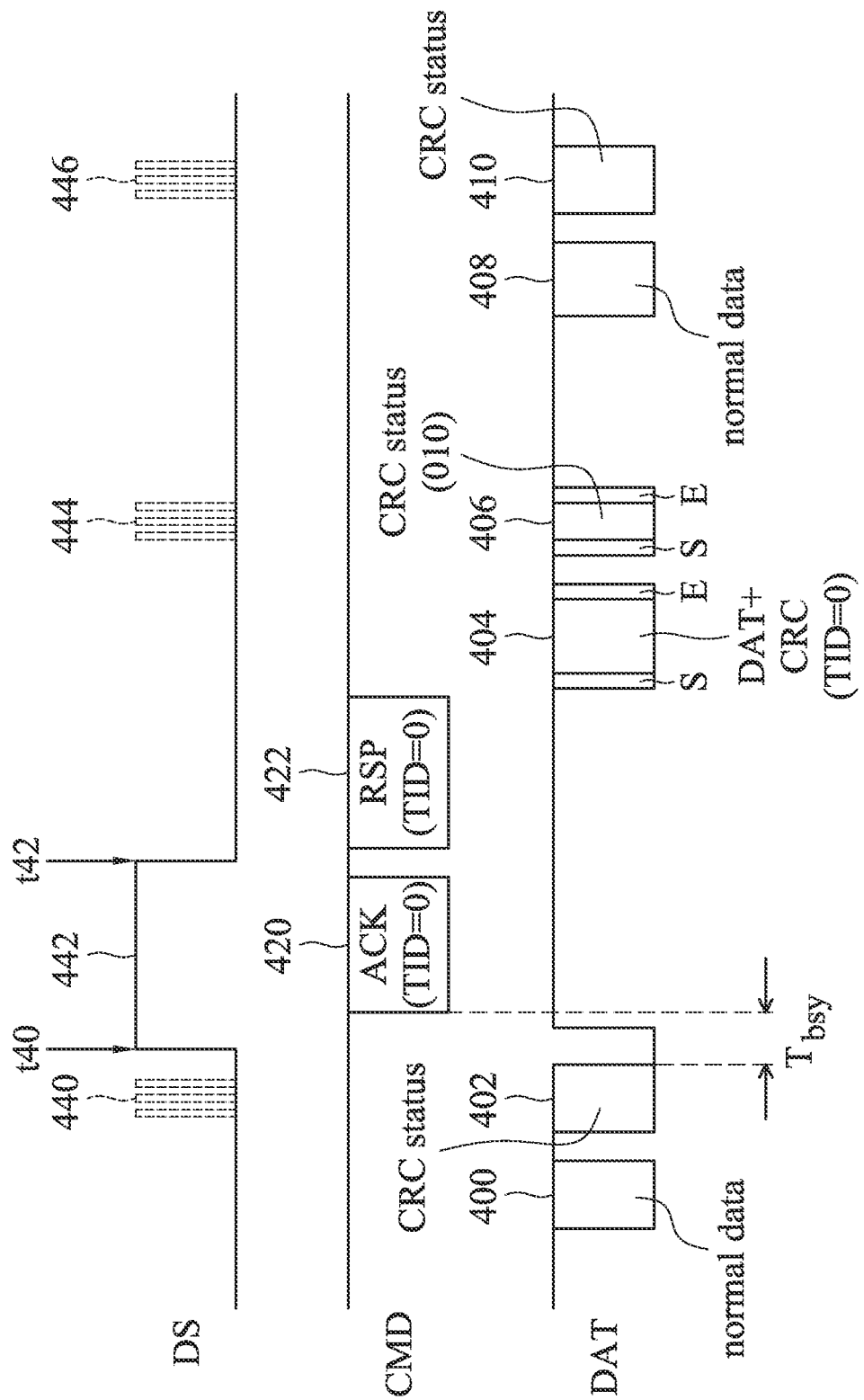
FIG. 4 illustrates a timing diagram of a DBM service request under a normal write transfer mode according to an embodiment of the invention.

Now turn to FIG. 4, illustrating a timing diagram of a DBM service request under a normal write transfer mode according to an embodiment of the invention When determining a DBM service request is required in the normal write transfer mode, the data storage device 10 is configured to assert a DS signal on the data strobe signal line DS at time t40. If the host device 12 can detect the DS signal on the data strobe signal line DS during the idle interval TDBM_req, then the host device 12 will regard that the data storage device 10 has issued a DBM request message 442. Under the normal write transfer mode, the earliest time at which the host device 12 can detect the asserted DS signal to identify the data storage device 10 wishes to acquire the control right of the bus 13, is the busy period Tbsy of the idle interval TDBM_req. Consequently, upon detecting the DBM request, the host device 12 is configured to suspend the ongoing normal write procedure, and respond to the received DBM request message 442 by sending a DBM acknowledgement message 420 on the command signal line CMD, allowing the data storage device 10 to acquire the control right of the bus 13. The time t40 at which the DBM request message 442 is inserted is not limited to the time shown in FIG. 4. In one preferred embodiment, the time t40 may be at any time point in the idle interval TDBM_req during which the host device 12 can detect the DS signal, thereby preventing the asserted DS signal from colliding with the DS signals used during the normal read and write procedures.

Table 3 details a format of the DBM acknowledgement message and register parameters thereof. It is worth noting that command indexes 60 through 63 are Vendor Defined commands in JEDEC eMMC 5.0 communication protocol standard. The table 3 shows an embodiment which employs the command index 60 as the DBM acknowledgement message corresponding to the DBM request. Those skilled in the art would recognize the command index 60 in the embodiment may be replaced by other vendor defined command, representing an acknowledgement message which corresponds to the DBM request. The embodiment adopts JEDEC eMMC 5.0 communication protocol standard as an example to illustrate the principle of the invention, nevertheless, other communication protocols which comply with the DBM acknowledgement message may also be adopted in place of JEDEC eMMC 5.0. A transaction ID TID in the DBM acknowledgement message represents data block number of a next data block to be accessed. The block sizes of each data block range between 1 and 512 bytes.

TABLE 3

| Bit position | Width (bits) | Value | Description |
|---|---|---|---|
| [47] | 1 | "0" | Start bit |
| [46] | 1 | "1" | Transmission bit |
| [45:40] | 6 | 6'h3c | Command index = 'd60 |
| [39:8] | 32 | X | Command argument.<br>[35:32]: Transaction ID<br>[8] = 1 indicates host controller accept "eMMC device bus master" request<br>Other bit: reserved. |
| [7:1] | 7 | X | 7-bit CRC |
| [0] | 1 | 1 | End bit |

Accordingly, the data storage device 10 obtains the control right of the bus 13 after receiving the DBM acknowledgement message 420, consequently the DS signal is de-asserted at a time t42 to stop the DBM request message 442. The length of the DBM request message 442 may be variable, the start point of the DBM request message 442 is determined by the time at which the data storage device 10 asserts the DS signal, and the end point of the DBM request message 442 is determined by the time at which the data storage device 10 receives the DBM acknowledgement message 420 from the host device 12. In order to be distinguished from the fast-toggling data strobe signal 440 in the normal write transfer mode, which prompts the host device 12 to start receiving the verification result $S_{CRC}$, the length of the DBM request message 442 at least equals or exceeds a time period of a clock cycle. The data storage device 10 next sends a DBM response message 422, which includes information such as a data transfer direction, an address or offset of the accessed temporary memory 124 in host device 12, a block size, and a block length. Table 4 provides a format for the DBM response message and the register parameters contained therein.

TABLE 4

| Bit position | Width (bits) | Value | Description |
| --- | --- | --- | --- |
| [135] | 1 | "0" | Start bit |
| [134] | 1 | "0" | Transmission bit |
| [133:128] | 6 | 6'h3c | Response index = 'd60 |
| [127:92] | 36 | 0 | reserved |
| [91:64] | 28 | X | Data offset in reserved memory, support MAX 256 MB memory space |
| [63:48] | 16 | X | Block size (1~512 is effective value)<br>0: no data transfer.<br>1: the transfer block length = 1 byte<br>...<br>'h200: the transfer block size = 512 bytes<br>>'h200: reserved.<br>If this field = 0, host controller will continue normal data transfer after RSP60 is received. |
| [47:32] | 16 | 0 | reserved |
| [31:28] | 4 | X | Transaction ID |
| [27:11] | 17 | 0 | Reserved |
| [10] | 1 | X | 0: no fatal error<br>1: device finds fatal error |
| [9] | 1 | X | More data transaction (chain)<br>0: device has no more data transaction for current request<br>1: device has more data transaction for current request |
| [8] | 1 | X | Data direction<br>0: data is transferred from device to host<br>1: data is transferred from host to device |
| [7:1] | 7 | X | 7-bit CRC, this field will be checked by host controller. |
| [0] | 1 | 1 | End bit |

Next, the host device 12 is configured to respond to the data storage device 10 based on the DBM response message 422. For example, in the embodiment in FIG. 4, the DBM response message 422 indicates a write operation from the host device 12 to the data storage device 10, thus the host device 12 is configured to transmit data in the temporary memory 124 corresponding to address assigned by the DBM response message 422 in the form of the DBM data message 404 to the data storage device 10, and receive the DBM verification status message 406 corresponding to the DBM data message 404 from the data storage device 10. Upon completion of the DBM service, the host device 12 is configured to continue the unfinished normal write operation, including sending the normal data message 408 and receiving the corresponding verification status message 410. Tables 5 and 6 list the format of the data messages (the format of the DBM data message 404 is identical to those of the normal data messages 400 and 408) and the format of the corresponding verification status message (the format of the DBM verification status message 406 is identical to those of the normal verification status messages 402 and 410), and the relevant register parameters.

TABLE 5

| Bit position | Width (bits) | Value | Description |
| --- | --- | --- | --- |
| [17 + N * 8] | 1 | 0 | Start bit |
| [17 + N * 8-1:17] | N * 8 | x | data |
| [16:1] | 16 | X | 16-bit CRC |
| [0] | 1 | 1 | End bit |

TABLE 6

| Bit position | Width(bits) | Value | Description |
| --- | --- | --- | --- |
| [4] | 1 | 0 | Start bit |
| [3:1] | 3 | X | CRC status<br>010: the data CRC check is OK<br>101: the data CRC check detect error. |
| [0] | 1 | 1 | End bit |

Although the embodiment of the DBM service shown in FIG. 4 illustrates the write operation transferred in the direction from the host device 12 to the data storage device 10, i.e., the data storage device 10 reads the buffered management table and data from the host device 12, those skilled in the art would recognize that the DBM service may also be a read operation transferred in the direction from the data storage device 10 to the host device 12, i.e., the data storage device 10 writes the buffered management tables and data into the host device 12. Note the data message accessed in the DBM service may be one or more data messages, thus the accessed data messages will be numbered based on the content sequence thereof. Each DBM data block transfer includes a corresponding DBM acknowledgement message ACK, a DBM response message RSP, and a DBM data message DAT+CRC, and the three types of messages are numbered based on the content sequence. In one embodiment, the host device 12 may access DBM data from and to the internal temporary memory 124 by Direct Memory Access (DMA). Specifically, the host device controller 122 contains a DMA engine (not shown) and a memory controller (not shown). The host device controller 122 accesses the temporary memory 124 by the DMA engine and the memory controller.

The data storage device 10 in the embodiment determines there is a need to access the data storage space of the host device 12 and requests a DBM service by a DBM request message, then acquires the control right of the bus 13. The data storage device 10 is configured to actively request to access the internal storage space of the host device 12 when needed.

Figure 5:
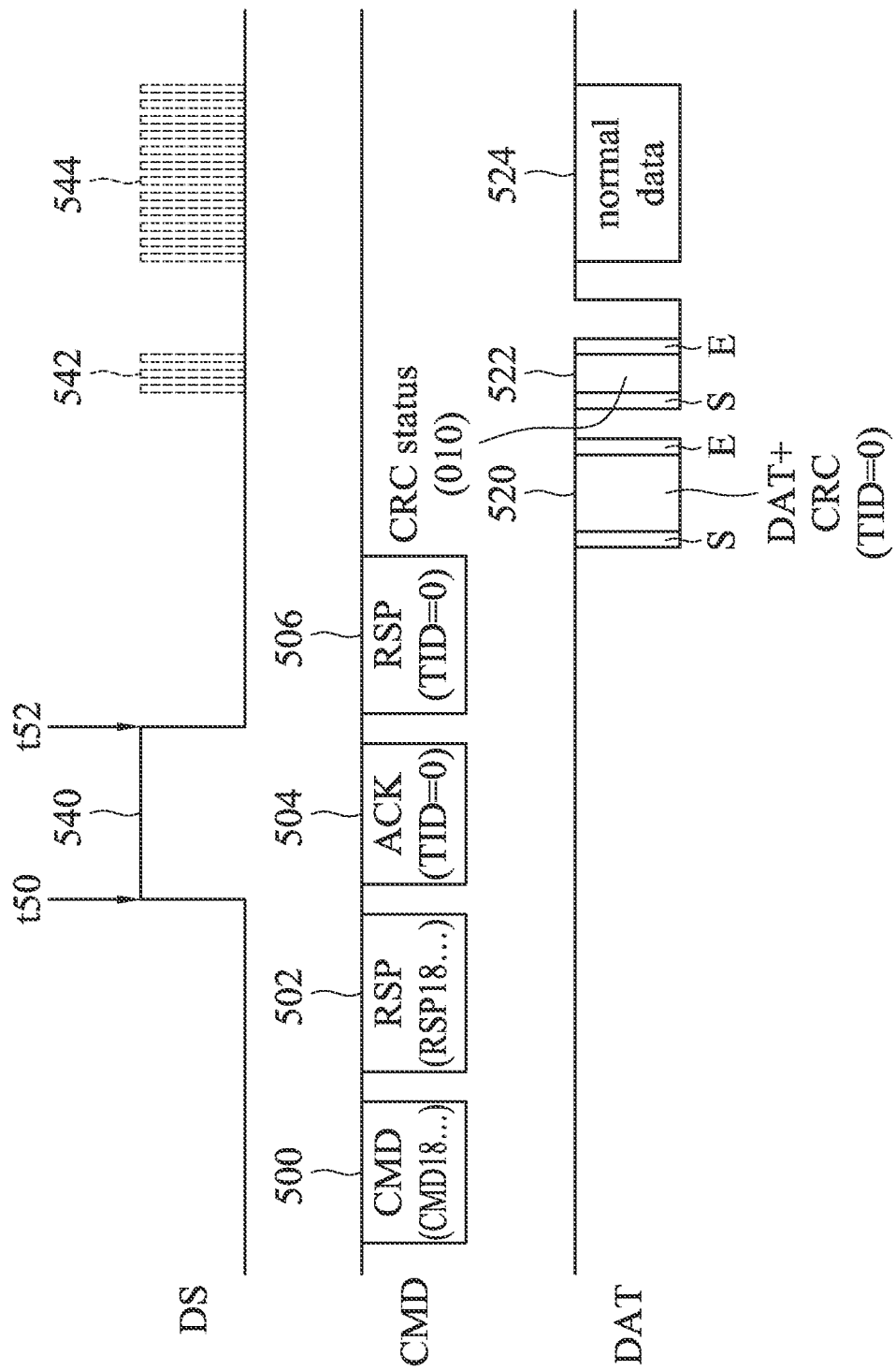
FIG. 5 is a timing diagram of a DBM service request under a normal read transfer mode according to an embodiment of the invention.

FIG. 5 is a timing diagram of a DBM service request under a normal read transfer mode according to an embodiment of the invention.

Prior to receiving the request of the DBM service, the host device 12 has sent an instruction command 500 such as a command CMD18 on the command signal line CMD to initiate a normal read operation, and has received a corresponding acknowledgement message 502 such as a command RSP18 from the data storage device 10, thus the normal read transfer mode has been entered. When the data storage device 10 determines a DBM service is needed in the normal read transfer mode, a DS signal will be asserted on the data strobe signal line DS at time t50. If the host device 12 detects the asserted DS signal on the data strobe signal line DS in the idle interval $T_{DBM\_req}$, then it will determine that the data storage device 10 has sent the DBM request message 540 to inform the host device 12 to initiate a DBM service. In the normal read transfer mode, the host device 12 may detect the DBM request message 540 in any idle intervals $T_{DBM\_req}$, i.e., recognize that the data storage device 10 wishes to obtain the control right of the bus 13, and therefore the ongoing normal read procedure will be suspended. The host device 12 can respond to the DBM request message 540 by transmitting a DBM acknowledgement message 504 on the command signal line CMD, allowing the data storage device 10 to acquire the control right of the bus 13. The format of the DBM acknowledgement message 504 and the relevant register parameters contained therein can find references in the preceding description for table 3.

Accordingly, the data storage device 10 acquires the control right of the bus 13 after receiving the DBM acknowledgement message 504, and can de-assert the DS signal at time t52 to stop the DBM request message 540. The data storage device 10 then issues a DBM response message 506 which contains information on a data transfer direction, a memory address to be accessed in the host device 12, and an accessed data length. The format of the DBM acknowledgement message 506 and the relevant register parameters contained therein can find references in the preceding description for table 4.

Then the host device 12 can respond to the data storage device 10 based on the DBM response message 506. For example, in the embodiment in FIG. 5, the DBM acknowledgement message 506 indicates a write operation transferred in the direction from the host device 12 to the data storage device 10, thus the host device 12 can send the data in the address of the temporary memory 124 assigned by the DBM response message 506 to the data storage device 10 in the form of the DBM data message 520, and receive a DBM verification status message 522 corresponding to the data message 520 from the data storage device 10. Upon completion of the DBM service, the host device 12 can resume the unfinished normal data procedure, including reading a normal data message 524 from the data storage device 10.

In another embodiment, the data storage device 10 may assert a DS signal to issue the DSB request message immediately after receiving a command message 500 of a read procedure from the host device 12, and terminate the DBM request message after the host device 12 acknowledges the DBM request (after sending a DBM acknowledge message 504). The length of the DBM request message 540 is indefinite, with a start point determined by the time at which the data storage device 10 asserts the DS signal, and an end point determined by the time at which the data storage device 10 receives the DBM acknowledgement message 504 from the host device 12. In order to be distinguished from the fast-toggling data strobe signal 542 which prompts the host device 12 to start receiving the DBM verification status message 522, and also distinguished from the toggling data strobe signal 544 which prompts the host device 12 to start receiving the normal read data message 524, the length of the DBM request message 540 at least equals or exceeds a one period of a clock cycle.

Although the embodiment of the DBM service shown in FIG. 5 illustrates the write operation transferred in the direction from the host device 12 to the data storage device 10, i.e., the data storage device 10 reads the buffered management table and data from the host device 12, those skilled in the art would recognize that the DBM service may also be a read operation transferred in the direction from the data storage device 10 to the host device 12, i.e., the data storage device 10 writes the buffered management tables and data into the host device 12. Note the data message accessed in the DBM service may be one or more data messages, thus the accessed data messages will be numbered based on the content sequence thereof. Each DBM data block transfer includes a corresponding DBM acknowledgement message ACK, a DBM response message RSP, and a DBM data message DAT+CRC, and the three types of messages are numbered based on the content sequence.

During an ongoing normal read procedure, the data storage device 10 in the embodiment determines there is a need to access the data storage space of the host device 12 and requests for a DBM service by a DBM request message, and then acquires the control right of the bus 13. The data storage device 10 is configured to actively request to access the internal storage space of the host device 12 when needed.

Figure 6:
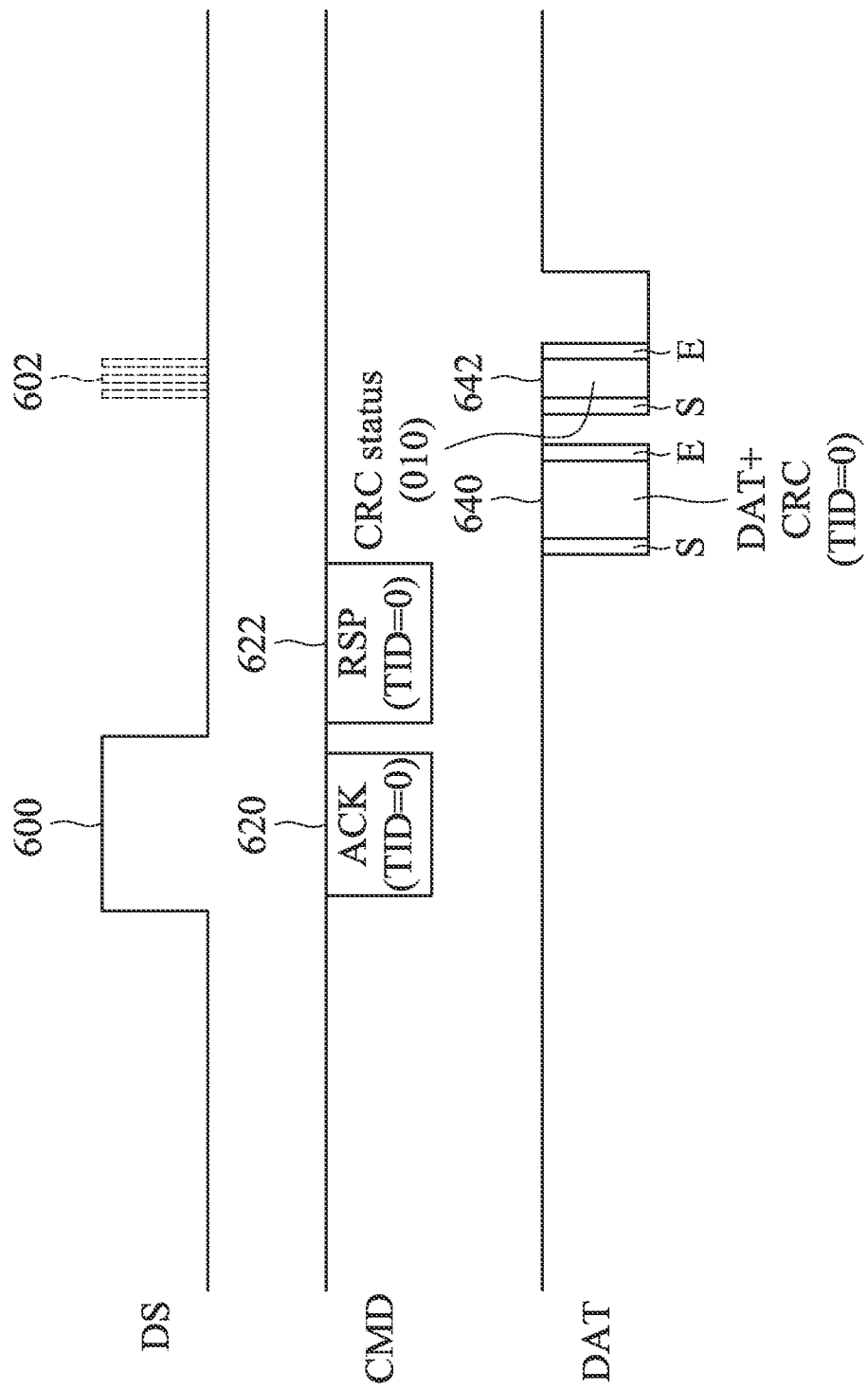
FIG. 6 is a timing diagram of a DBM service request under an idle mode according to an embodiment of the invention.

FIG. 6 is a timing diagram of a DBM service request under an idle mode according to an embodiment of the invention.

In the idle mode, when the data storage device 10 determines a need to initiate a DBM service, a DS signal can be asserted on the data strobe single line DS at any time. The host device 12 detects the asserted DS signal, recognizes that the data storage device 10 has sent a DBM request message 600, and responds to the DBM request message 600 with a DBM acknowledgement message 620 on the command signal line CMD, then receives a corresponding response message 622 from the data storage device 10, and accepts control from the data storage device 10 to access the internal memory 124 of the host device 12. After the DBM service, the host device 12 and the data storage device 10 can return to the idle mode.

Figure 7:
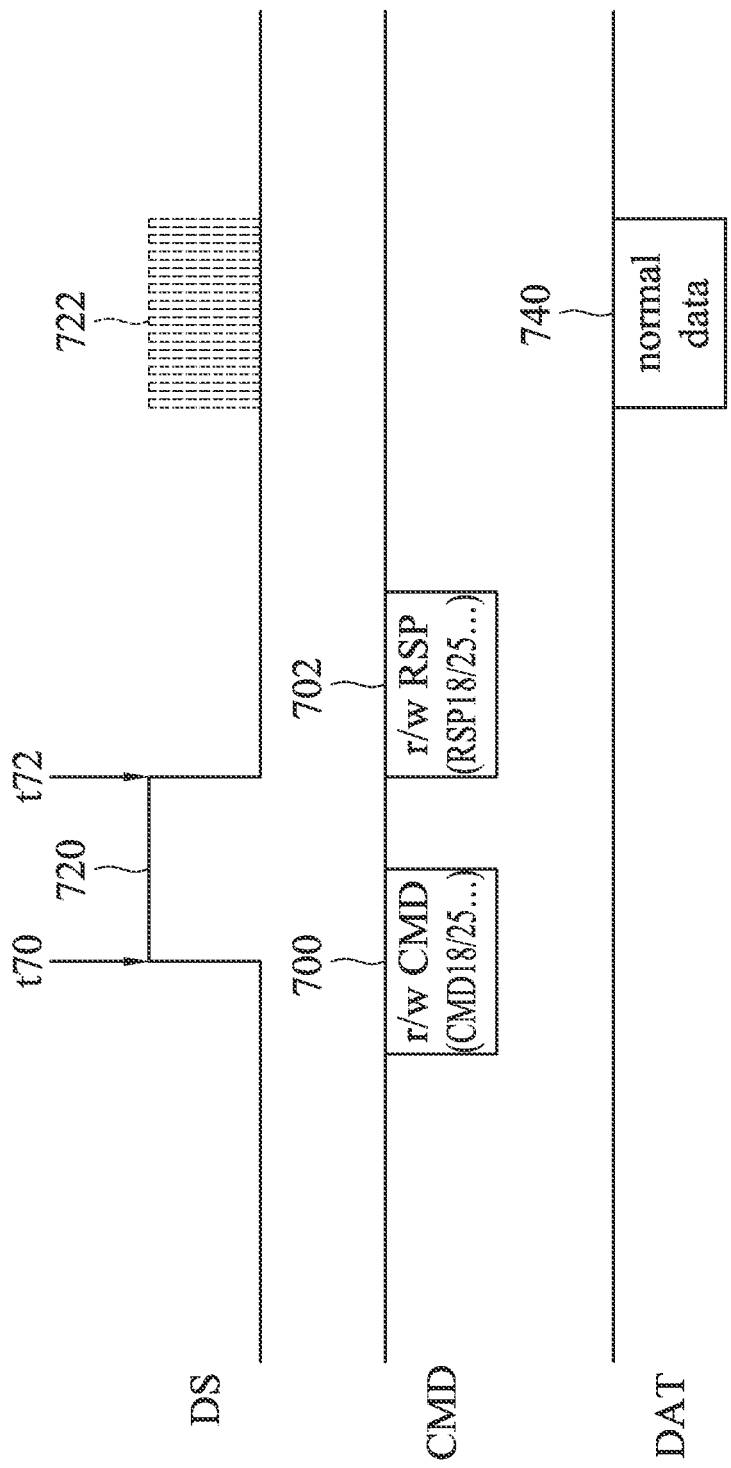
FIG. 7 is a timing diagram of canceling a DBM service request according to an embodiment of the invention.

FIG. 7 is a timing diagram of canceling a DBM service request according to an embodiment of the invention. The data storage device 10 is configured to cancel a DBM request message that has been sent.

When the data storage device 10 receives a read or write command message 700 (command CMD18 or CMD25) from the host device 12 and inserts a DBM request message 720 by asserting the DS signal on the data strobe signal line DS at time t70, if then the data storage device 10 wishes to proceed with the normal read or write procedure and terminate the DBM request, the data storage device 10 can then de-assert the DS signal at time t72 before transmitting a response message 702, thereby cancelling the DBM request message 720 that has been just sent. The host device 12 is configured to ignore the last received DBM request message 720 and continues to proceed with the normal read or write procedure after receiving the response message 702.

Figure 8:
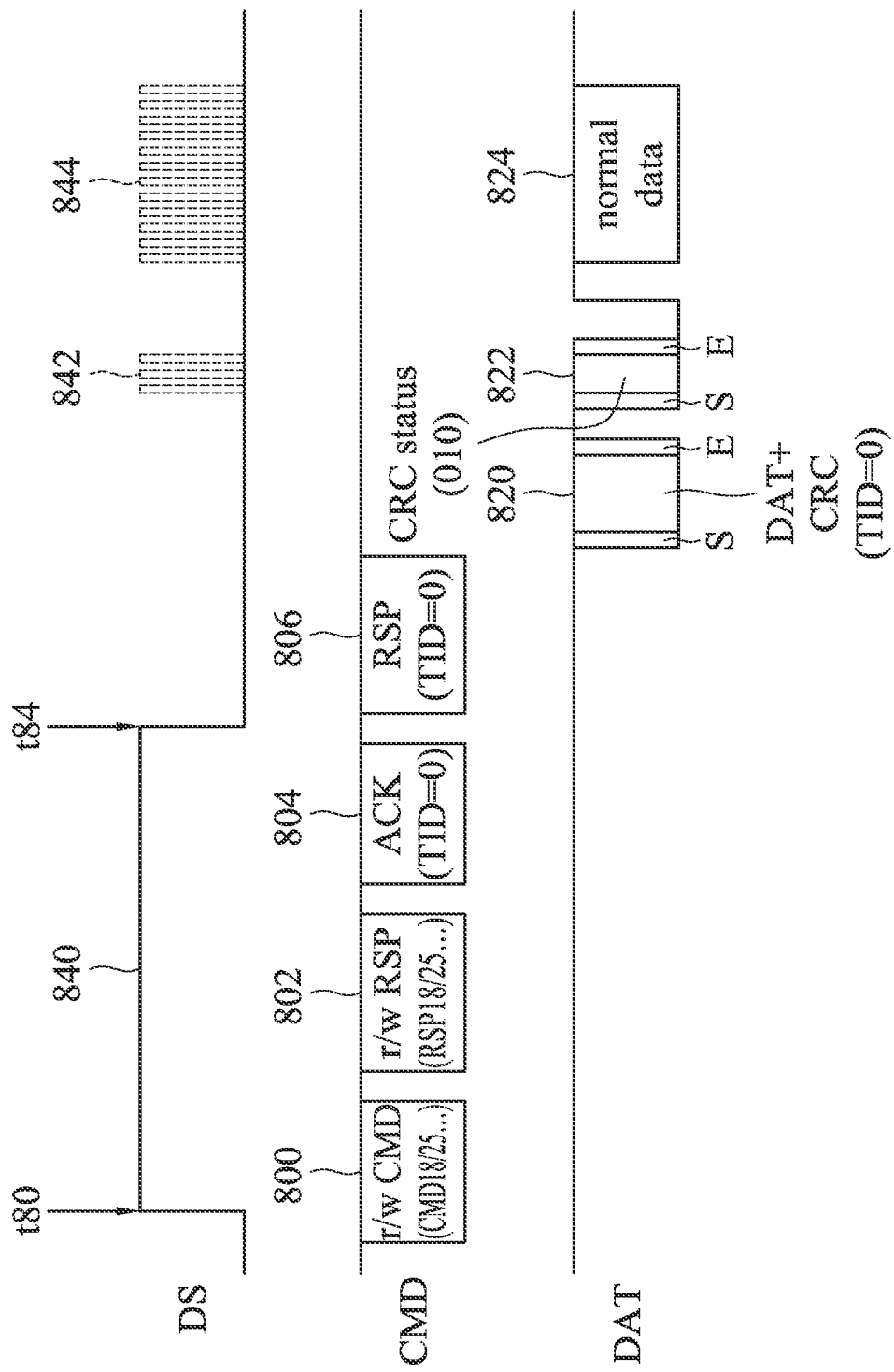
FIG. 8 illustrates an embodiment for the data storage device 10 sending a respond message without canceling the DBM request message.

In contrast, if the data storage device 10 fails to terminate the DBM request message after sending the response message 702, then host device 12 is configured to accept the DBM request message, respond with a corresponding acknowledgement message, and start the DBM service procedure. FIG. 8 illustrates an embodiment for the data storage device 10 sending a respond message without canceling the DBM request message. The data storage device 10 receives a read or write command message 800 (command CMD18 or CMD25) from the host device 12 and inserts a DBM request message 840 by asserting the DS signal on the data strobe signal line DS at time t80, and the data storage device 10 continues asserting the DBM request message 840 without de-asserting while responding to a response message 802. Therefore, the host device 12 is configured to detect the DBM request message 840 in the idle interval, respond with a corresponding acknowledgement message 804, and initiate the DBM service procedure.

Figure 9:
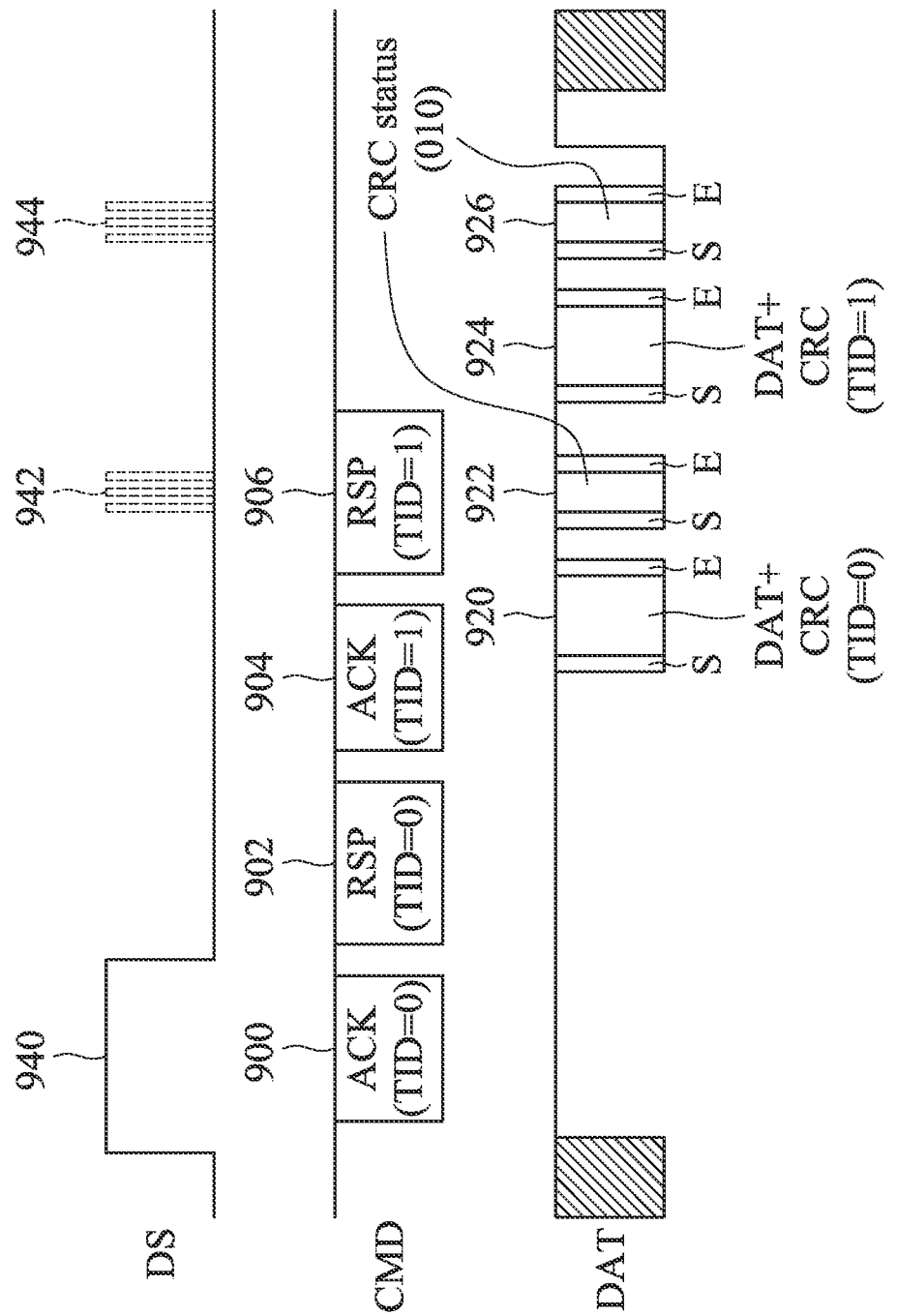
FIG. 9 is a timing diagram of requesting a DBM service according to an embodiment of the invention.

FIG. 9 is a timing diagram of requesting a DBM service according to an embodiment of the invention, adopted to transmit consecutive DBM data messages from the host device 12 to the data storage device 10.

The data storage device 10 can adopt the DBM service procedure to continuously read the DBM data messages from the host device 12 to the data storage device 10. When the data storage device 10 sends a DBM request message 940 and acquires a DBM acknowledgement message 900 from the host device 12, the data storage device 10 is configured to respond with a DBM response message 902, which includes information about a data storage address and a data length to be read from the host device 12. According to the DBM response message 902, the host device 12 is configured to transmit a first transfer data of buffered management table or data (TID=0) in the internal memory 124 by a DBM data message 920, and obtains a DBM verification status message 922 corresponding to the DBM data message 920 from the data storage device 10. During transmitting the DBM data message 920, the host device 12 is configured to transmit a DBM acknowledgement message 904 on the command signal line CMD which contains the next transfer data (TID=1), obtain a DBM response message 906 from the data storage device 10. Thus in a way of pipeline, the host device 12 could continue to transmit the next transfer data of buffered management table or data (TID=1) via a DBM data message 924 after receiving the DBM verification status message 922 indicating correct data, and then receive a corresponding DBM verification status message 926.

The data storage device 10 in the embodiment, in a DBM service procedure, receives consecutive and multiple buffered management tables and data in the internal memory 125 in a way of pipeline, thereby efficiently accessing the data storage space of the host device 12.

Figure 10:
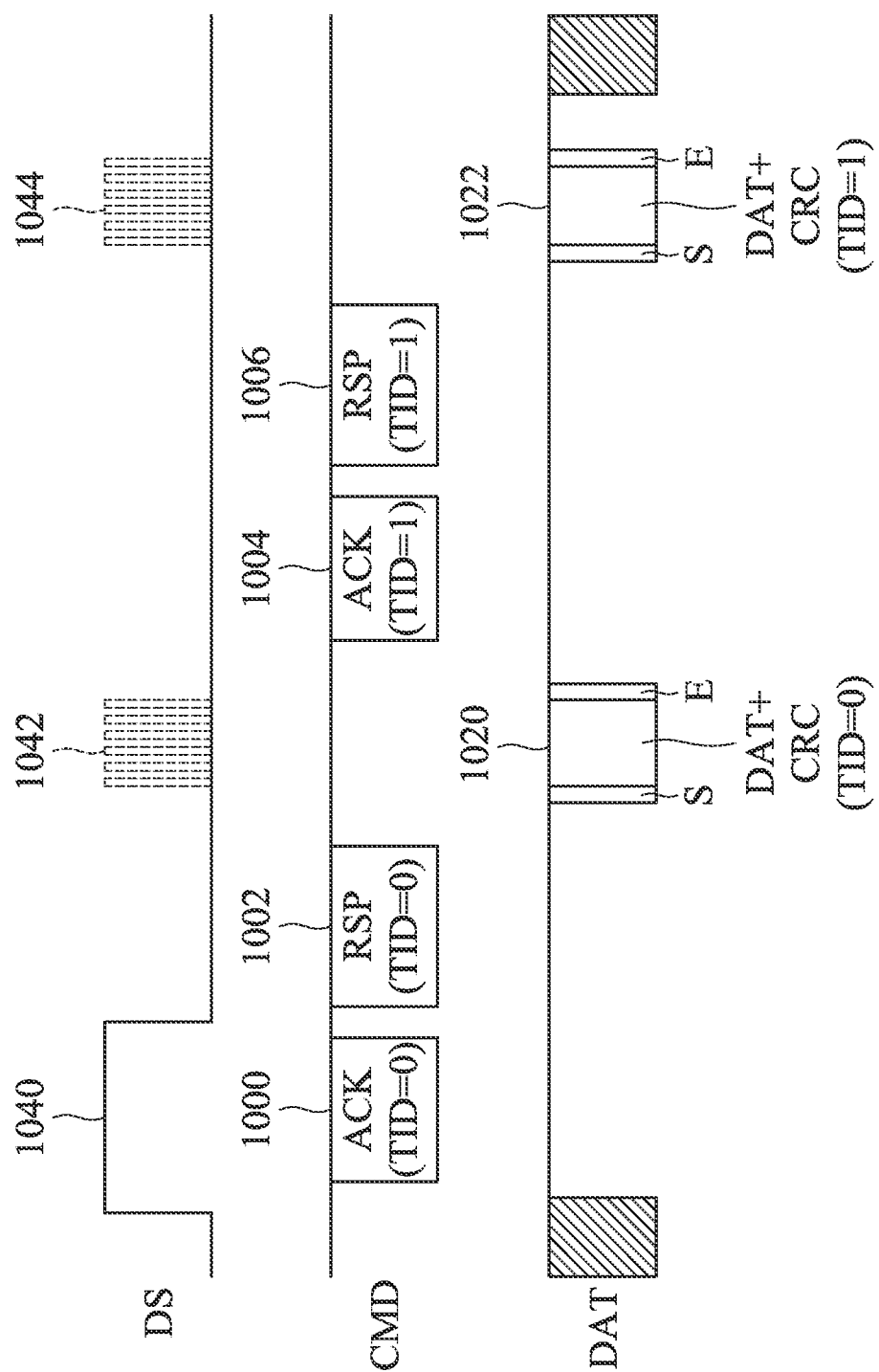
FIG. 10 is a timing diagram of requesting a DBM service according to another embodiment of the invention.

FIG. 10 is a timing diagram of requesting a DBM service according to another embodiment of the invention, adopted to transmit consecutive DBM data messages from data storage device 10 to the host device 12.

The data storage device 10 can adopt the DBM service procedure to continuously write the DBM data messages into the host device 12. When the data storage device 10 sends a DBM request message 1040 and acquires a DBM acknowledgement message 1000 from the host device 12, the data storage device 10 is configured to respond with a DBM response message 1002, which includes information about a data storage address and a data length to be written into the host device 12. According to the DBM response message 1002, the data storage device 10 is configured to write a first transfer data of buffered management table or data (TID=0) into the internal memory 124 of the host device 12 by a DBM data message 1020. After receiving the DBM data message 1020 and verifying the data correctness thereof, the host device 12 is configured to transmit a DBM acknowledgement message 1004 on the command signal line CMD for the next transfer data (TID=1), obtain a DBM response message 1006 from the data storage device 10, and continue receiving the next DBM data message 1022 (TID=1).

The data storage device 10 in the embodiment, in a DBM service procedure, transmits consecutive and multiple buffered management tables and data in the internal memory 125 in a way of pipeline, thereby efficiently accessing the data storage space of the host device 12.

In certain embodiments, the data storage device 10 sends a DBM request message and then receives a corresponding DBM acknowledgement message ACK from the host device 12. At this point the data storage device 10 determines the DBM data transfer is no longer required, so the data storage device 10 sets both the access data address and the data length as 0 ([127:8]=0) in the DBM response message RSP responded on the command signal line CMD. After receiving such a response message RSP, the host device 12 determines all DBM data messages as having been transmitted, and sets the storage system 1 back to the status before the DBM request, resuming the normal data transfer or returning to the idle state.

Figure 11:
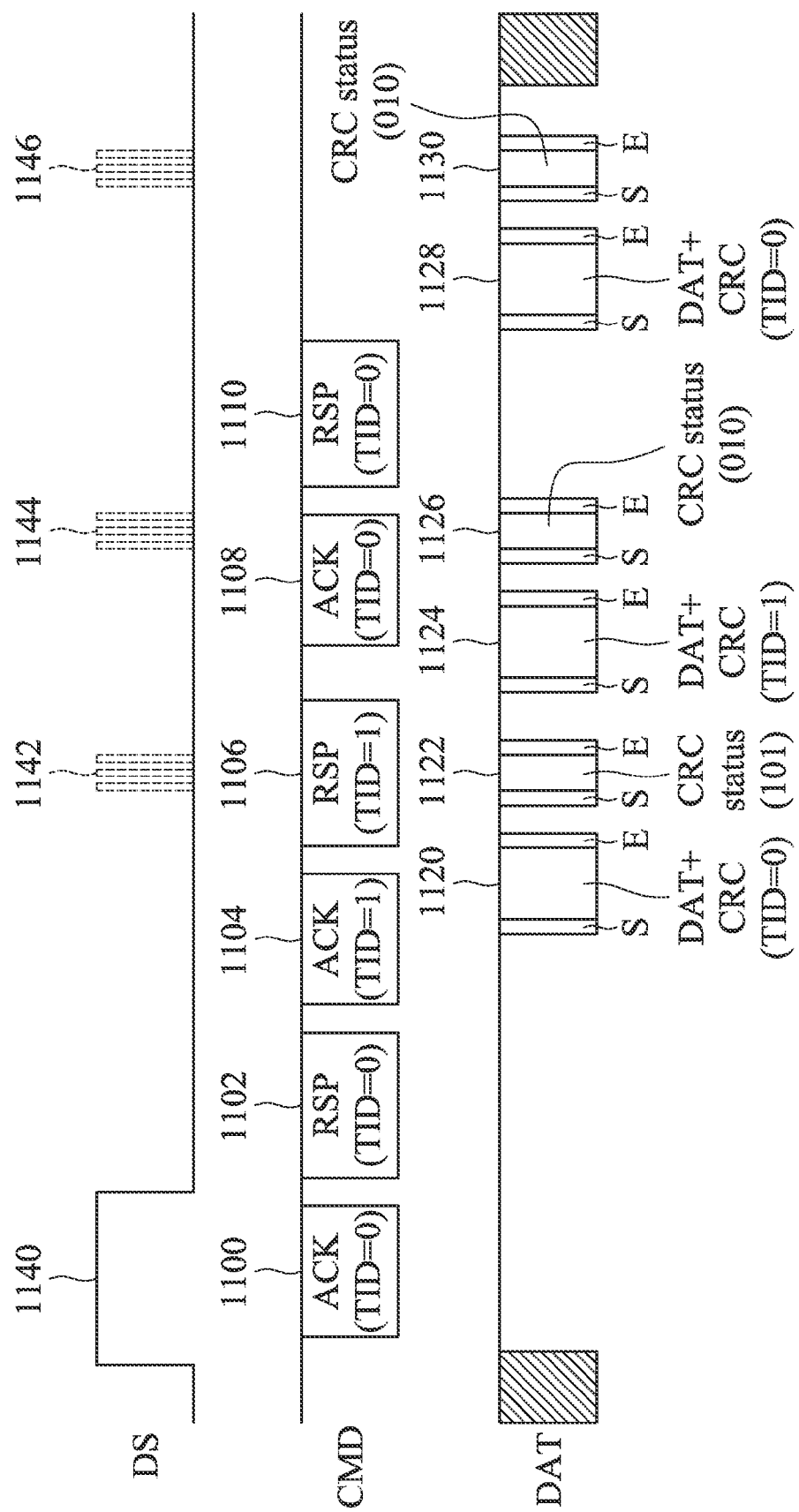
FIG. 11 is a timing diagram of a management method of managing write errors in a DBM service procedure according to an embodiment of the invention.

FIG. 11 is a timing diagram of a management method of managing write errors in a DBM service procedure according to an embodiment of the invention. The embodiments in FIGS. 11 and 9 are substantially similar, except after verifying the first DBM data (TID=0), the data storage device 10 identifies a transfer data error and a retransmission corresponding to the incorrect DBM data is required.

After verifying the first DBM data message 1120 (TID=0), the data storage device 10 identifies a transfer data error, and informs the host device 12 of the error via a DBM verification status message 1122. For example, the DBM verification status message 010 represents correct CRC-verified data, and the DBM verification status message 101 represents incorrect CRC-verified data. The DBM verification status message is, but not limited to, transmitted serially on the data signal line DAT[0]. Since the host device 12 has permitted the next DBM data transmission (TID=1) before acquiring the DBM verification status message 1122, therefore the next DBM data message 1124 is transmitted and a corresponding DBM verification status message 1126 is received accordingly. After determining the first DBM data message 1120 has an error, the host device 12 is configured to retransmit a DBM acknowledgement message 1108 to acknowledge the retransmission for the first DBM data (TID=0). The host device 12 is configured to retransmit the first DBM data message 1128 (TID=0) after acquiring the DBM response message 1110. If the DBM verification status message 1130 from the data storage device 10 indicates that the DBM data message 1128 has been verified correctly, then all DBM data are transmitted successfully. Consequently the DBM service procedure is completed and returns to a transfer state prior to entering the DBM service procedure. If the host device 12 cannot receive a DBM verification status message indicating a correct verification from the data storage device 10 after several retransmissions of the same DBM data (e.g., the data with TID=0), then a fatal error of the data storage system 1 is identified, and the host device controller 122 issues a DBM fatal error interrupt as described in table 2 to the driver of the host device 12, triggering the driver to reset the system 1. Moreover, when the data storage device 10 has a local fatal error, a DBM response message RSP[10] as described in table 4 is reported. When the host device 12 receives such a DBM response message RSP, a DBM fatal error interrupt will be issued to the driver of the host device 12, allowing the driver to reset the system 1.

Figure 12:
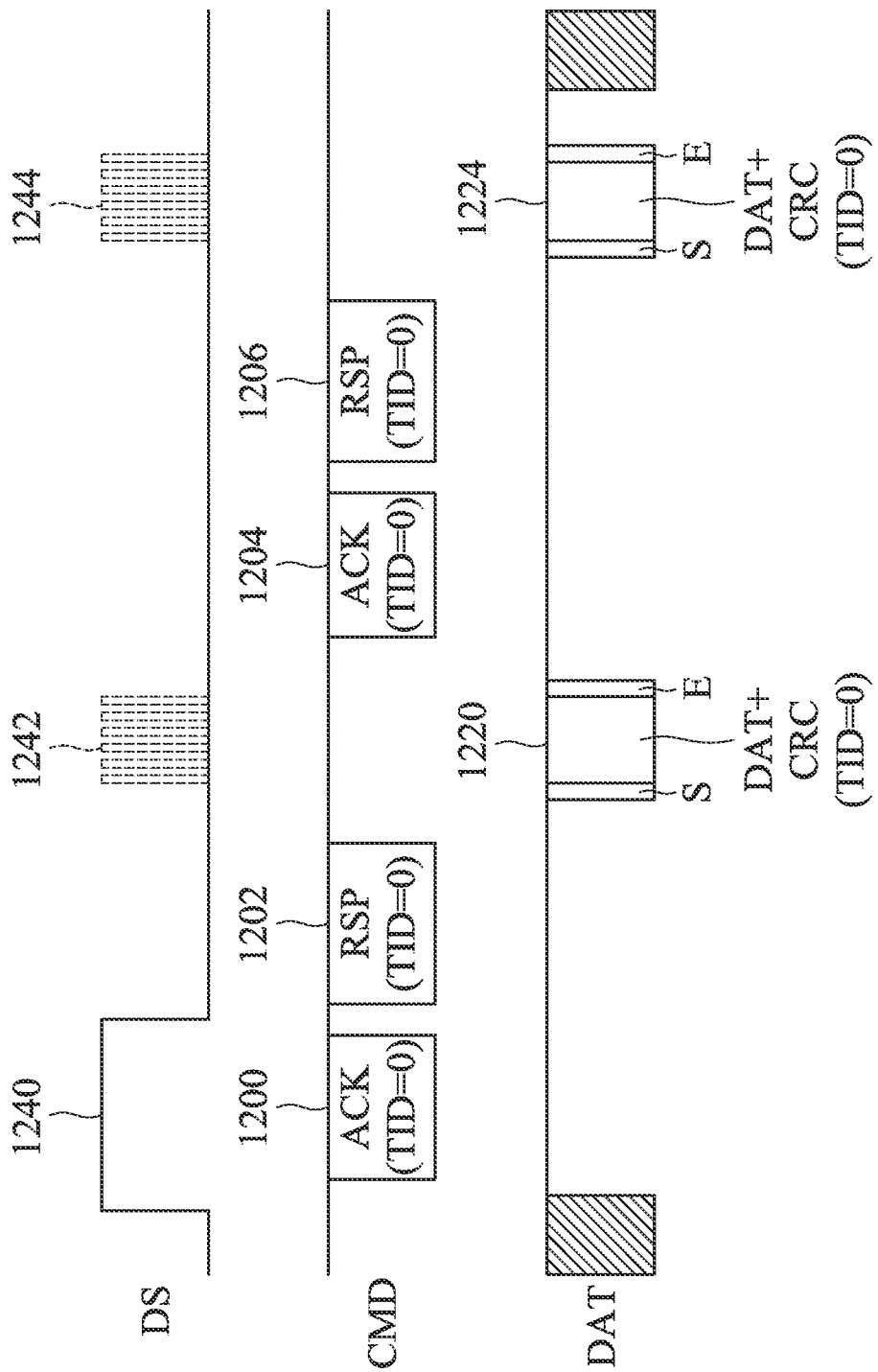
FIG. 12 is a timing diagram of a management method of managing read errors in a DBM service procedure according to another embodiment of the invention.

FIG. 12 is a timing diagram of a management method of managing read errors in a DBM service procedure according to another embodiment of the invention. In the embodiments in FIG. 12, the host device 12 discovers a data transfer error after verifying the first DBM data (TID=0), and retransmits the incorrect DBM data.

The host device 12 verifies the first DBM data message 1220 (TID=0) based on the CRC data (refer to table 5) in the first DBM data message 1220. If a data transfer error is identified, then the host device 12 is configured to transmit a DBM acknowledgement message 1204, allowing to retransmit the first DBM data (TID=0). After a corresponding DBM response message 1206, the data storage device 10 can retransmit the first DBM data message 1224 (TID=0). If the verification result of the host device 12 indicates that the retransmitted DBM data message 1224 is verified correctly, then the DBM service procedure is completed and returns to a transmission state prior to entering the DBM service procedure. In other embodiments, the DBM service procedure may transmit the next DBM data message (TID=1, not shown) before or after retransmitting the first DBM data message 1224 (TID=0). Moreover, similar to the write procedure in FIG. 11, in the read procedure, if the host device 12 retries several DBM acknowledgement messages of the same TID without receiving correctly verified DBM data from the data storage device 10, then a fatal error of the data storage system 1 occurs, and the host device controller 122 issues a DBM fatal error interrupt as described in table 2 to the driver of the host device 12, triggering the driver to reset the system 1. Moreover, when the data storage device 10 has a local fatal error, a DBM response message RSP[10] as described in table 4 is reported. When the host device 12 receives such a DBM response message RSP, a DBM fatal error interrupt will be issued to the driver of the host device 12, allowing the driver to reset the system 1.

Figure 13:
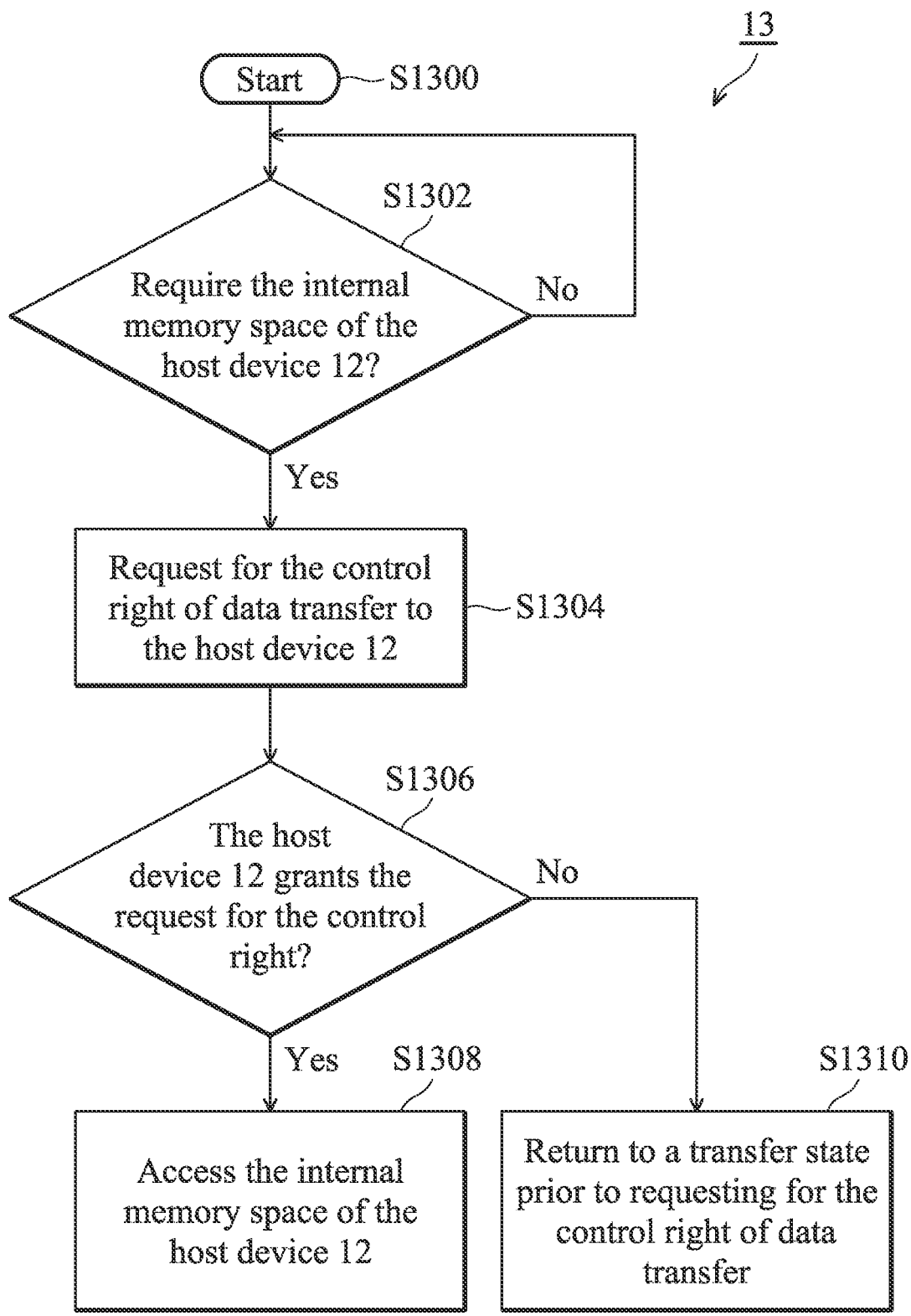
FIG. 13 is a flowchart diagram of a management method 13 adopted by a data storage system according to another embodiment of the invention, incorporating the data storage system 1.

FIG. 13 is a flowchart diagram of a management method adopted by a data storage system according to another embodiment of the invention, incorporating the data storage system 1.

Upon initiation of the management method 13, the parameters and circuits of the data storage device 10 and the host device 12 are initiated, ready for providing the DBM service procedure (S1300).

Next the data storage device 10 is configured to determine whether the internal temporary memory 124 of the host device 12 is required to access the data belonging to the temporary memory 106 of the data storage device 10 (S1302). When it is not required, the data storage device 10 is configured to returns to Step S1302, continuing to determine whether the internal temporary memory 124 of the host device 12 is required and whether a DBM service procedure should be initiated. On the other hand, when it is required, the data storage device 10 is configured to issue a DBM request message to the host device 12 via the bus 13, requesting for the right to control data transfer on the bus 13 (S1304). In some embodiments, the data storage device 10 is configured to issue the DBM service request by asserting a data strobe signal DS on the data strobe signal line DS on the bus 13.

After sending the DBM request message, the data storage device 10 is configured to detect the command signal line CMD to determine whether the host device 12 acknowledges the right to control data transfer on the bus 13 (S1306). If a DBM acknowledgement message from the host device 12 is detected, then the data storage device 10 is configured to access the internal temporary memory 124 of the host device 12 (S1308).

In particular, when the system 1 is undergoing a normal read or write procedure and the DBM request message is issued, then the host device 12 is configured to detect the DBM request message during the idle interval $T_{DBM\_req}$ in the read or write data transfer (please refer to the embodiments in FIGS. 2 and 3 for details), suspend the ongoing read or write data transfer, and respond with a DBM acknowledgement message accordingly. If the system 1 is in an idle state and the DBM request message is issued, then the host device 12 is configured to detect the DBM request message immediately, and respond with a DBM acknowledgement message accordingly. Upon receiving the DBM acknowledgement message, the data storage device 10 is configured to send a DBM response message corresponding to the DBM acknowledgement message, which includes information about a data address and a data length to be accessed from the internal memory 124 of the host device 12. The host device 12 is configured to access the data in the internal memory 124 according to the DBM response message from the data storage device 10, thereby accessing the management tables and data buffered by the data storage device 10. In certain embodiments, after receiving the DBM acknowledgement message, the data storage device 10 may de-assert the data strobe signal DS to stop the DBM service request. Since the host device 12 could only detect the DS signal on the data strobe signal line DS during the idle interval $T_{DBM\_req}$ (please refer to the embodiments in FIGS. 2 and 3 for details), thus the DS signal should be asserted until the system enters the idle interval $T_{DBM\_req}$. In one embodiment, the data storage device 10 is configured to assert the DS signal until the host device 12 has returned the DBM acknowledgement message ACK in response to the DBM service request, i.e., after receiving the DBM acknowledgement message ACK, the data storage device 10 could de-assert the DS signal. In another embodiment, the data storage device 10 is configured to de-assert the DS signal before the completion of transferring a DBM response message RSP. Since a DBM data message transfer stage is entered after transmitting the DBM response message RSP, the host device 12 is required to detect the fast-toggling DS signal during the data message transfer stage to determine whether it should start to receive the verification status message (in the write procedure) or the data message (in the read procedure) from the data storage device 10.

If no DBM acknowledgement message from the host device 12 is detected, the data storage device 10 is configured to return to the transmission state before sending the DBM service request message (S1310). The transmission state before sending the DBM service request message may be the idle state, the write transfer state or the read transfer state. In certain embodiments, despite detecting the DBM acknowledgement message from the host device 12, the data storage device 10 may determine the DBM data transfer is no longer needed and withdraw the DBM service request. The data storage device 10 may do so by setting both the data address and the data length in the DBM response message RSP to be 0 ([127:8]=0). After receiving such a response message RSP, the host device 12 is configured to regard all DBM data messages have been completed, and restoring the storage system 1 back to the state before the DBM request.

The management method 13 in the embodiment can initiate a DBM service procedure in the idle state, write transfer state and read transfer state, allowing the data storage device 10 to obtain the control right of the bus. The data storage device 10 is configured to actively request to access the internal storage space of the host device 12 when needed without being affected by other procedures.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or another programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, units, modules, circuits and systems described herein may be implemented by ways of, but not limited to, hardware, firmware, software, software in execution, and a combination thereof.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method, adopted by a data storage device coupled to a host device via a bus, comprising:
   determining the data storage device requires to use a first temporary memory of the host device to store data in a second temporary memory of the data storage device;
   based on the determination, issuing a Device Bus Master (DBM) request message via the bus to the host device to request for a control right to control data transfer on the bus;
   in response to the DBM request message, detecting the bus to determine whether to receive a first DBM acknowledgement message from the host device; and
   if the first DBM acknowledgement message is received, transmitting a DBM response message to the host device, and then accessing the first temporary memory of the host device,
   wherein the DBM response message comprises relevant information for accessing the first temporary memory of the host device, and wherein the relevant information includes a data address and a data length of the first temporary memory of the host device,
   wherein the first DBM acknowledgement message and DBM response message are transmitted through the same command signal line of the bus as normal instruction command and response command.

2. The method of claim 1, wherein the issuing the DBM request message step comprises:
   asserting a data strobe signal on a data strobe signal line of the bus to issue the DBM request message.

3. The method of claim 1, wherein when the host device is performing a read or a write operation to the data storage device, the host device detects said DBM request message in an idle interval.

4. The method of claim 3, wherein:
   the idle interval comprises an interval after the host device has received a normal response command from the data storage device and before transmitting a normal data message;
   the idle interval further comprises a block gap between transferring two normal data messages.

5. The method of claim 1, further comprising:
   after receiving the first DBM acknowledgement message, stopping issuing the DBM request message to the host device.

6. The method of claim 1, further comprising:
   after receiving the first DBM acknowledgement message, if the data storage device requires to cancel the request for the control right, a DBM response message is transmitted to the host device, wherein all relevant information in the DBM response message are configured as 0.

7. The method of claim 1, further comprising:
   before receiving the first DBM acknowledgement message, if the data storage device needs to cancel the request for the control right, stopping issuing the DBM request message to the host device prior to receiving the first DBM acknowledgement message.

8. The method of claim 1, wherein the accessing the first temporary memory of the host device step comprises:
   receiving a first write data from the host device;
   verifying the first write data, and reporting a verification result to the host device; and
   when the verification result indicates the first write data is incorrect, the host device retransmits the first DBM acknowledgement message.

9. The method of claim 8, wherein the accessing the first temporary memory of the host device step further comprises:
   when the verification result indicates the first write data is correct, the host device transmits a second DBM acknowledgement message to transmit a second write data.

10. The method of claim 1, wherein the accessing the first temporary memory of the host device step comprises:
    transmitting a first read data to the host device; and
    when the host device verifies that the first read data is incorrect, retransmitting the first DBM acknowledgement message.

11. The method of claim 10, wherein the accessing the first temporary memory of the host device step further comprises:
when the host device verifies that the first read data is correct, the host device transmits a second DBM acknowledgement message to read a second read data.

12. A data storage system, comprising:
a data storage device; and
a host device, coupled to the data storage device through a bus;
wherein the data storage device comprises:
a data storage controller, configured to determine the data storage device needs to use a first temporary memory of the host device to store data in a second temporary memory of the data storage device; and
a data storage transceiver, coupled to the data storage controller, based on the determination, configured to issue a Device Bus Master (DBM) request message via the bus to the host device to request for a control right to control data transfer on the bus;
the host device comprises:
a host device controller, after detecting the DBM request message, configured to issue a first DBM acknowledgement message via the bus; and
wherein the data storage controller is configured to detect the bus to determine whether to receive the first DBM acknowledgement message from the host device, and if the first DBM acknowledgement message is received, transmit a DBM response message to the host device, and then access the first temporary memory of the host device,
wherein the DBM response message comprises relevant information for accessing the first temporary memory of the host device, and wherein the relevant information includes a data address and a data length of the first temporary memory of the host device,
wherein the first DBM acknowledgement message and DBM response message are transmitted through the same command signal line of the bus as normal instruction command and response command.

13. The data storage system of claim 12, wherein the data storage controller is configured to assert a data strobe signal on a data strobe signal line of the bus to issue the DBM request message.

14. The data storage system of claim 12, wherein when the host device is performing a read or a write operation to the data storage device, the host device detects said DBM request message in an idle interval.

15. The data storage system of claim 14, wherein:
the idle interval comprises an interval after the host device has received a normal response command from the data storage device and before transmitting a normal data message;
the idle interval further comprises a block gap between transferring two normal data messages.

16. The data storage system of claim 12, wherein:
after receiving the first DBM acknowledgement message, the data storage controller is configured to stop issuing the DBM request message to the host device.

17. The data storage system of claim 12, wherein:
the data storage transceiver is configured to receive a first write data from the host device;
the data storage controller is configured to verify the first write data, and report a verification result to the host device; and
when the verification result indicates the first write data is incorrect, the host device controller is configured to retransmit the first DBM acknowledgement message.

18. The data storage system of claim 17, wherein:
when the verification result indicates the first write data is correct, the host device controller is configured to transmit a second DBM acknowledgement message to transmit a second write data.

19. The data storage system of claim 12, wherein:
the data storage transceiver is configured to transmit a first read data to the host device; and when verifying that the first read data is incorrect, the host device is configured to retransmit the first DBM acknowledgement message.

20. The data storage system of claim 12, wherein:
when verifying the first read data is correct, the host device controller is configured to transmit a second DBM acknowledgement message to read a second read data.

21. The data storage system of claim 12, wherein data in the second temporary memory of the data storage device comprises management tables and data of a flash memory of the data storage device.

22. The method of claim 1, wherein each data transfer includes a corresponding DBM acknowledgement message and a corresponding DBM response message.

23. The data storage system of claim 12, wherein each data transfer includes a corresponding DBM acknowledgement message and a corresponding DBM response message.

* * * * *